March 24, 1959  G. HEINRICH ET AL  2,879,111
GAS-LUBRICATED RADIAL JOURNAL BEARINGS Filed Oct. 7, 1954  2 Sheets-Sheet 1

GERHARD HEINRICH
ALFRED SLIBAR
INVENTORS

BY Karl F. Ross
AGENT

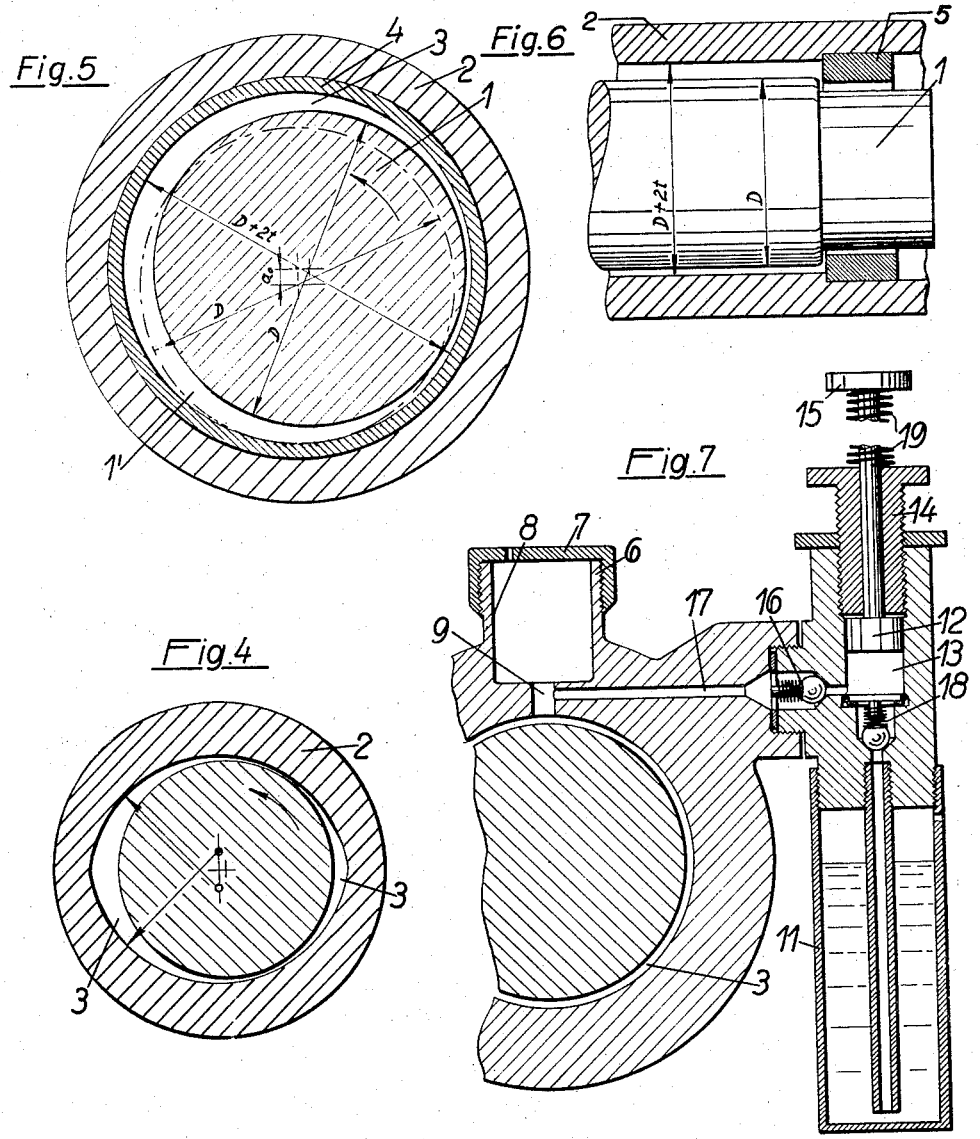

United States Patent Office 2,879,111
Patented Mar. 24, 1959

2,879,111

GAS-LUBRICATED RADIAL JOURNAL BEARINGS

Gerhard Heinrich and Alfred Slibar, Vienna, Austria

Application October 7, 1954, Serial No. 460,980

Claims priority, application Austria December 2, 1953

2 Claims. (Cl. 308—9)

This invention relates to radial journal bearings which employ a gaseous medium as a lubricant and carrying means and can be applied to bearings of all diameters.

It is known to supply radial journal bearings with a liquid or gaseous medium under pressure through ducts opening into the bearing gap, in order to obtain the desired carrying strength. In those known constructions liquid lubricant is pressurized by a separate pump, gaseous lubricant by a separate compressor. It is also known to increase the carrying strength of radial journal bearings employing a liquid lubricant by giving a special shape to the relatively moving surfaces, e.g. by the provision of a wedge-shaped gap. In the latter constructions the medium surrounding the parts of the bearing is pressurized by the rotation so as to increase the carrying strength but all the known bearing constructions of that type employ a liquid lubricant (oil), as is proved by the high bearing pressures per unit area indicated in the pertinent patent literature.

All known bearing constructions employing lubricating oil have the disadvantage that particularly when running at high and very high speeds they are either subject to high wear or require great power to overcome the bearing friction. In many cases special provision must be made for extracting the heat of friction. Another difficulty encountered in said bearings consists in that a temperature rise of the oil will reduce the viscosity thereof so that the film of lubricant may break in permanent operation. On the other hand, the known air-lubricated bearings with compressor require considerable constructional expense.

It is a general object of the invention to provide a radial journal bearing in which all the disadvantages indicated hereinbefore are avoided.

It is another object of the invention to provide a radial journal bearing suitable for wearfree permanent operation particularly at high speed substantially without solid or liquid lubricant and without requiring the provision of accessories for pressurizing a gaseous lubricant.

It is a specific object of the invention to provide a radial journal bearing for operation below a predetermined load-speed ratio and designed to pressurize a gaseous lubricant at that load-speed ratio sufficiently to provide the desired carrying strength.

The invention relates more specifically to a radial journal bearing which employs as a lubricant a gaseous medium having the coefficient of viscosity $\eta$ and which comprises means forming a bore and a journal received in said bore, for operation below a predetermined load-speed ratio between the mean load $p_m$ per unit area and a speed at which adjacent surfaces of said bore and journal have the relative velocity $c_U$, and which has the relative roughness $$z = \frac{t - a_0}{t}$$

where $t$ is the mean difference between bore radius and journal radius and $a_0$ is the critical eccentricity or the displacement of the journal center required to cause linear contact between journal and bore. The invention provides a bearing of this type in which the value of $t$ as defined above and the journal diameter $D$ are related to each other so that the dimensionless ratio $$R = \frac{2}{3\pi} \frac{p_m \cdot t^2}{\eta \cdot c_U \cdot D}$$

of the parameters influencing the carrying strength of the gaseous lubricant does not exceed the limiting value at which the linear contact between journal and bore begins at that predetermined load-speed ratio, which limiting value of said dimensionless ratio is a function of said relative roughness $z$ for each value of $$x = \frac{L}{D}$$

where $L$ is the effective length of the bearing, i.e. the length of the line of contact between journal and bore, and $D$ has the value defined before.

In the accompanying drawing,

Fig. 1 is a graph showing several curves for the limiting values of the dimensionless ratio $R$ of the parameters influencing the carrying strength of the gaseous lubricant, plotted for several values of $$x = \frac{L}{D}$$

against the relative roughness $z$,

Fig. 4 is a cross-sectional view of a bearing bushing and the journal of a bearing according to the invention, comprising a wedge-shaped gap.

Fig. 5 is a longitudinal sectional view of another embodiment of the invention.

Fig. 6 is a cross-sectional view of another embodiment and

Fig. 7 is a cross-sectional view of a fourth embodiment.

All figures are diagrammatic. The embodiments represented diagrammatically in Figs. 4, 5 and 6 comprise means for providing additional carrying strength for operation of the bearing above said predetermined load-speed ratio.

The following description will refer to radial journal bearings in which the journal and bore are strictly cylindrical in shape.

Figure 1:
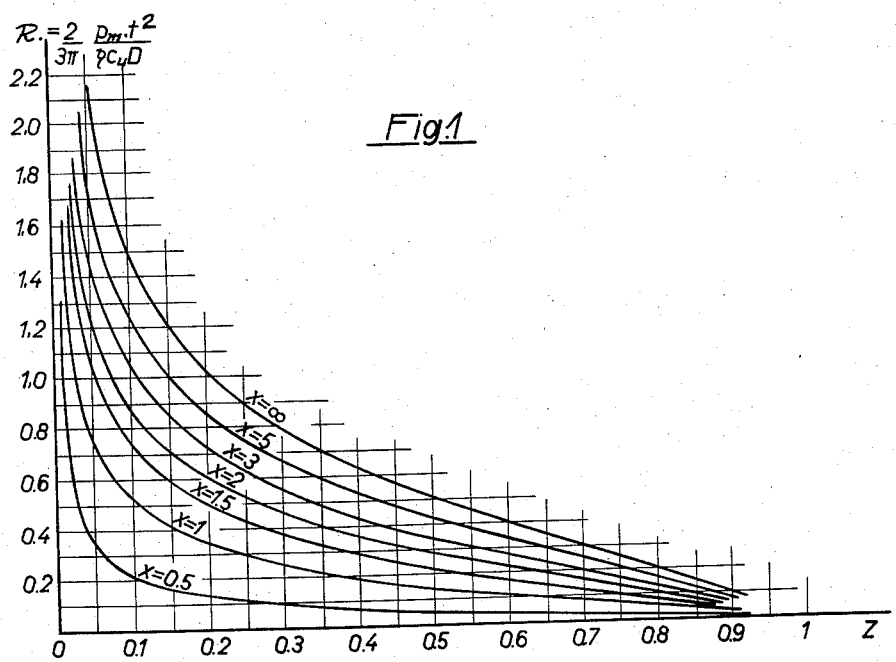

The criterion whether the desired carrying strength has been reached is the dimensionless ratio $$R = \frac{2}{3\pi} \frac{p_m \cdot t^2}{\eta \cdot c_U \cdot D}$$

of the parameters influencing the carrying strength. In the graph shown in Fig. 1 the ordinates are the upper limiting values of $R$ for different values of the parameter $x$, and the abscissae are the values of the relative roughness $z$. The carrying strength to be achieved according to the invention is reached if the dimensions of the bearing are chosen so that the $R$ does not exceed the limiting values apparent from Fig. 1. The smaller the dimensionless ratio is compared with the limiting value apparent from Fig. 1, the greater is the safety against contact between the adjacent surfaces of journal and bore. If the ratio $R$ just reaches the limiting value indicated in Fig. 1, linear contact will commence if the relative roughness has the appertaining value $z$.

Figure 2:
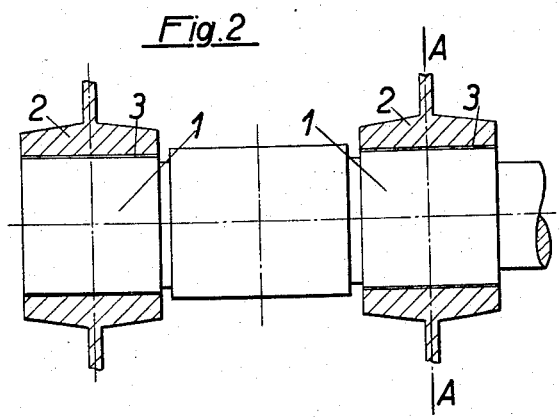
Fig. 2 is a diagrammatical longitudinal sectional view of an illustrative bearing constructed according to the invention.
Figure 3:
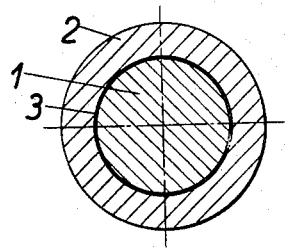
Fig. 3 is a sectional view taken in the plane A—A of Fig. 2.

In Figs. 2 and 3 the rotary journal is designated with 1 and runs in a bore formed by the brasses 2. The bearing gap 3 is shown with exaggerated width.

Generally the bearings run in atmosphereic air so that the bearing gap is inherently filled with air under the pressure of the outer atmosphere. If the journal and bore are dimensioned according to the invention that air will be pressurized by the relative rotation of said parts, to provide the desired bearing strength. If in special cases the bearing runs in a closed space filled with gas or air under pressure, the gas filling the bearing gap will provide the same carrying sterngth in a similar manner.

In bearings constructed according to the invention the carrying strength and stability can be improved by giving the beaging gap between journal and bore a shape other than that of a circular cylinder, e.g. by the use of a wedge-shaped gap, as is known per se.

Fig. 4 shows a corresponding embodiment in a diagrammatic sectional view. Here the bearing bushing 2 has an out-of-round bore, whose cross-section is limited, e.g., by two arcs rather than by a single circle. A wedge-shaped gap is shown between the bore wall and the journal surface. The journal is shown in a position which it will assume in operation.

Without departing from the scope of the invention the carrying strength provided by the gas or air flow may be assisted by introducing into the bearing gap solid or liquid lubricant not sufficient for a normal lubrication of the bearing. That measure may be effected before or during the operation of the bearing. It will be understood that the introduction of liquid lubricant will not serve to reduce the relative roughness $z$ (which depends on the quality of the adjacent surfaces of the journal and bore) but to provide a lubricating medium when said surfaces should contact each other.

Since in bearings constructed according to the invention the full carrying strength will be obtained only after a minimum speed has been reached, it will be advantageous in many cases to provide special means, which may be of known type, for assisting the starting or running down of the bearing, e.g. by the introduction of solid or liquid lubricant into the bearing.

Fig. 5 shows the positions of the journal of a bearing according to the invention in rotation and at rest (with dash lines). The air gap 3 is apparent, which is confined by the two circular eccentric lines of intersection of the bore of the bearing bushing 2 or of the journal 1 with the plane of section which is at right angles to the bearing axis. The journal will be supported by the bearing bushing when at rest. The line of cross-section 1' (shown in dot-dash lines) has an eccentricity $a_0$ relative to the bore center. The bearing bushing has a lining 4, which may consist, e.g., of a graphite-iron alloy, which will provide for lubrication by a solid medium when the journal should contact the bearing wall.

A similar provision is made in the embodiment shown in Fig. 6, in which a contact of the journal with the surface of the actual bearing bushing is prevented when the journal is at rest or under excessive load. The bearing bushing 2 has at one end a recess, which receives a ring 5 consisting, e.g., of an iron-graphite alloy and adapted to support the reduced end of the journal 1 if the self-maintaining air layer cannot be formed for any reason whatever.

The embodiment shown in section in Fig. 7 is a bearing which comprises additional means for introducing liquid lubricant between the journal and the bore, more particularly additional means for introducing a lubricant while the bearing is operated at a speed insufficient to maintain the ratio $p_m/c_U$ below the above-mentioned predetermined load-speed ratio. The bearing bushing has attached at the top a lubricating cup 6 having a cover 7. That cup receives a suitable lubricating oil or grease for the lubrication of the bearing if an operation under the conditions normal for this bearing is not possible for some time. In that case the lubricant passes from the supply 8 through a duct 9 into the gap 3 between the surfaces of the journal and bearing bore. That bearing is also provided with a device which can be actuated during operation to inject a predetermined amount of lubricant into the bearing gap if it is found that the self-maintaining air layer does not form. For the sake of conciseness it may be sufficient to describe this simple devise by its mode of operation. A piston 12 movable in a cylinder 13 sucks a predetermined amount of lubricant, which depends on the stroke adjustable by the screw 14, from a container 11 holding liquid lubricant. When the piston is pressed down by means of the handle 15 the amount of lubricant is fed through a ball valve 16 and through the oil lines 17 and 9 to the bearing gap. The valve 18 will prevent a return flow of the lubricant into the container 11. Upon release of the handle 15 the spring 19 will urge the piston 12 to its initial position whereby new lubricant is sucked into the space of the cylinder 3.

In view of what has been said hereinbefore the invention thus enables a perfectly wear-free permanent operation of the bearing substantially without solid or liquid lubricants, without requiring the provision of pumps, compressors or other accessories. As compared with normal oil bearings a much reduced friction torque and thus reduced generation of heat is obtained. As contrasted with oil-lubricated bearings, any temperature rise of a gas or air bearing will cause an increase of the absolute viscosity $\eta$ of the carrying gas or air, whereby its carrying strength is increased.

We claim:

1. A method of operating at a minimum safe speed a rotating system having a journal lodged in a bearing bore, said bore and said journal having a relative roughness $$z = \frac{t - a_0}{t}$$

where $t$ is the mean difference between bore radius and journal radius and $a_0$ is the critical eccentricity defined as the displacement of the journal center relative to the bore center required to cause linear contact between journal and bore, said journal exerting a mean load pressure per unit area $p_m$ upon said bore, said journal having a diameter $D$ and said bearing having an effective length $L$, comprising the steps of admitting a surrounding gaseous medium at substantially atmospheric pressure and of coefficient of viscosity $\eta$ between said journal and said bearing bore, and operating said system at a speed high enough so that the relative velocity $c_U$ between journal and bore assumes a value at which the dimensionless ratio $$R = \frac{2 p_m t^2}{3 \pi \eta c_U D}$$

as a function of $z$ is not greater than a limiting value at which linear contact between journal and bore begins.

2. A method according to claim 1, wherein for a particular $x = L/D$ the value of $R = f(z)$ does not exceed the value given by the corresponding graph of Fig. 1.

References Cited in the file of this patent

UNITED STATES PATENTS

| | | |
|---|---|---|
| 2,442,202 | Hughes-Caley | May 25, 1948 |
| 2,603,539 | Brewster | July 15, 1952 |
| 2,660,484 | Gerard et al. | Nov. 24, 1953 |
| 2,796,659 | Buske | June 25, 1957 |

FOREIGN PATENTS

| | | |
|---|---|---|
| 331,734 | Germany | July 19, 1916 |

OTHER REFERENCES

Boswall: "The Theory of Film Lubrication," 1928, Chapter IX, published by Longman, Green and Co., N. Y.